US010701460B2

(12) United States Patent
Obara

(10) Patent No.: US 10,701,460 B2
(45) Date of Patent: *Jun. 30, 2020

(54) METHODS AND SYSTEM FOR PRESENTING SEARCH RESULTS

(71) Applicant: Rovi Guides, Inc., San Jose, CA (US)

(72) Inventor: Takeaki Obara, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,486

(22) Filed: Apr. 17, 2019

(65) Prior Publication Data

US 2019/0313162 A1 Oct. 10, 2019

Related U.S. Application Data

(63) Continuation of application No. 16/025,524, filed on Jul. 2, 2018, now Pat. No. 10,306,337, which is a continuation of application No. 14/754,864, filed on Jun. 30, 2015, now Pat. No. 10,057,659.

(51) Int. Cl.
| | |
|---|---|
| *H04N 21/84* | (2011.01) |
| *H04N 21/482* | (2011.01) |
| *H04N 21/845* | (2011.01) |
| *H04N 21/2665* | (2011.01) |
| *H04N 21/462* | (2011.01) |
| *G06F 16/738* | (2019.01) |
| *H04N 21/235* | (2011.01) |
| *H04N 21/472* | (2011.01) |

(52) U.S. Cl.
CPC .......... *H04N 21/84* (2013.01); *G06F 16/738* (2019.01); *H04N 21/2353* (2013.01); *H04N 21/2665* (2013.01); *H04N 21/4622* (2013.01); *H04N 21/47202* (2013.01); *H04N 21/4828* (2013.01); *H04N 21/8456* (2013.01)

(58) Field of Classification Search
None
See application file for complete search history.

(56) References Cited

U.S. PATENT DOCUMENTS

| 8,079,047 B1* | 12/2011 | Jerding | H04N 21/47202 709/231 |
|---|---|---|---|
| 2003/0154484 A1* | 8/2003 | Plourde, Jr. | H04N 5/44543 725/58 |
| 2006/0031881 A1* | 2/2006 | Barrett | H04N 5/44543 725/46 |
| 2009/0055868 A1* | 2/2009 | Wehmeyer | H04N 5/44543 725/40 |

(Continued)

*Primary Examiner* — Alexander Q Huerta
(74) *Attorney, Agent, or Firm* — Haley Guiliano LLP

(57) ABSTRACT

Systems and methods are described herein for a media guidance application that facilitates presenting, to a user, media assets that match a search expression by generating for display media asset identifiers corresponding to media assets that are scheduled for transmission to a plurality of users during a specific time interval. The media asset identifiers corresponding to media assets that match the search expression are distinguished from media asset identifiers that correspond to media assets that do not match the search expression. Furthermore, media asset identifiers corresponding to media assets that match the search expression are distinguished from each other based on an attribute of each media asset that matches the search expression.

20 Claims, 5 Drawing Sheets

(56) References Cited

U.S. PATENT DOCUMENTS

| | | | |
|---|---|---|---|
| 2010/0154005 A1* | 6/2010 | Baxter | H04N 5/44543 725/56 |
| 2012/0150902 A1* | 6/2012 | Midgley | G06F 16/951 707/769 |
| 2013/0086613 A1* | 4/2013 | Mountain | H04N 21/4312 725/46 |
| 2013/0167091 A1* | 6/2013 | Klappert | G06F 3/0481 715/849 |
| 2014/0007164 A1* | 1/2014 | Gossweiler, III | H04N 5/44543 725/44 |
| 2015/0026147 A1* | 1/2015 | Jonsson | H04N 21/232 707/706 |
| 2016/0140247 A1* | 5/2016 | Skolicki | H04N 21/4622 707/706 |
| 2016/0147766 A1* | 5/2016 | Davidoff | G06F 16/9535 707/725 |
| 2016/0255376 A1* | 9/2016 | Hanai | H04N 5/44543 725/53 |
| 2016/0357752 A1* | 12/2016 | Jon | G06F 16/24578 |
| 2018/0181571 A1* | 6/2018 | Venkataraman | G06F 16/48 |

* cited by examiner

600

602
Identify Based on a Search Expression, a First Plurality Of Media Assets That is Scheduled for Transmission to a Plurality of Users During a Time Interval

604
Generate for Display a Second Plurality of Media Asset Identifiers Corresponding to Media Assets that are Scheduled for Transmission to a Plurality of Users During the Time Interval

606
Visually Distinguish a First Portion of the Second Plurality of Media Asset Identifiers, Corresponding to the First Plurality of Media Assets Identified Based on the Search Expression, From a Second Portion of the Second Plurality of a Media Asset Identifiers Corresponding to Media Assets Not Identified Based on the Search Expression, Wherein a First Media Asset Identifier in the First Portion is Visually Distinguished From a Second Media Asset Identifier in the First Portion Based on a First Attribute Associated with a First Media Asset Corresponding to the First Media Asset Identifier and a Second Attribute Associated with a Second Media Asset Corresponding to the Second Media Asset Identifier

FIG. 6

METHODS AND SYSTEM FOR PRESENTING SEARCH RESULTS

BACKGROUND

In conventional systems, users have access to a plethora of media content. In most cases users can view what content will be available in the future through a media guidance application. However, with so much content available, users often require assistance in locating content that they may be interested in. In addition, users require an efficient system that is able to present that content and differentiate that content from content that is not of interest to those users.

SUMMARY

Accordingly, systems and methods are described herein for a media guidance application that facilitates presenting, to a user, media assets that match a search expression by generating for display media asset identifiers corresponding to media assets that are scheduled for transmission to a plurality of users during a specific time interval where the media asset identifiers corresponding to media assets that match the search expression are distinguished from media asset identifiers that correspond to media assets that do not match the search expression. Furthermore, media asset identifiers corresponding to media assets that match the search expression are distinguished from each other based on an attribute associated with each corresponding media asset that matches the search expression.

In some aspects, the media guidance application may identify, based on a search expression, a first plurality of media assets that are scheduled for transmission to a plurality of users during a time interval. For example, the media guidance application may receive (e.g., from a user) a search expression that includes a keyword "sports." The media guidance application may then search available media assets (e.g., by searching metadata associated with the available media assets) for "sports." As a result, for example, the media guidance application may include in the first plurality of media assets those media assets that match the keyword "sports" and are scheduled for transmission to the plurality of users between the hours of 8 PM and 11 PM.

The media guidance application may then generate for display a second plurality of media asset identifiers corresponding to media assets that are scheduled for transmission to the plurality of users during the time interval. As in the example above, the media guidance application may have determined the time interval to be between the hours of 8 PM and 11 PM. Based on the time interval, the media guidance application may generate for display a grid that shows on one axis the time interval (e.g., 8 PM to 11 PM) and on another axis representations of content sources (e.g., channels, Internet sources, video-on-demand sources, etc.). Inside the grid, the media guidance application may generate for display media asset identifiers that correspond to media assets that will be transmitted to the plurality of users during the time interval and from those content sources corresponding to the displayed representations.

The media guidance application may visually distinguish between a first portion of the second plurality of media asset identifiers and a second portion of the second plurality of media asset identifiers. The first portion of the second plurality media asset identifiers may correspond to media assets identified based on the search expression, and the second portion of the second plurality of media asset identifiers may correspond to media assets not identified based on the search expression. For example, the media guidance application may generate for display the media asset identifiers in the second portion free of any special indicators, while the media asset identifiers in the first portion may be generated for display with specific indicators (e.g., different colors, different shading, different symbols, etc.).

The media guidance application may further visually distinguish media asset identifiers in the first portion from each other based on an attribute associated with their respective media assets. As exemplified above, the media guidance application may receive a search expression that includes keyword "sports" and identify a football game and an ice hockey game as media assets that are scheduled to be transmitted to the plurality of users between the hours of 8 PM and 11 PM. The media guidance application may generate for display a media asset identifier associated with the football game ("the first media asset identifier") in one color (e.g., blue) and generate for display a media asset identifier associated with the ice hockey game ("the second media asset identifier") in a different color (e.g., red). As a result, the first and second media asset identifiers will be distinguished from each other based on a type of sport, an attribute associated with each respective media asset. The media guidance application may, of course, identify more media assets that match a search expression that includes keyword "sports" and generate for display other media asset identifiers associated with other sports in different colors (e.g., media asset identifier for a baseball game in color yellow). The media guidance application may use indicators other than color to distinguish between media asset identifiers with a different attribute (e.g., different shading, different geographical shapes, different fonts, or textual indicators).

In some embodiments, the media guidance application may identify, based on the search expression, the first plurality of media assets that is scheduled for transmission to the plurality of users during the time interval by first receiving the search expression from a user. For example, the media guidance application may enable a user to input keywords to be included in a search expression. Additionally or alternatively, the media guidance application may enable the user to select different attributes or types of attributes associated with media assets to be used in a search expression. Those attributes may include medium type of media asset (e.g., video, audio, book, etc.), program type of the media asset (e.g., movie, news program, documentary, cartoon, sit-com, sports, etc.), and/or genre of the media asset (e.g., drama, action, comedy, etc.).

The media guidance application may then perform a search of media assets that are scheduled for transmission to the plurality of users. For example, the media guidance application may search all metadata available (e.g., media asset identifiers) whether locally (e.g., on a set top box) or remotely (e.g., on a server) to identify media assets that match the search expression.

The media guidance application may determine the time interval, where the time interval corresponds to a time period that includes a largest number of media assets that are found based on the search. For example, the media guidance application may have received keyword "movies" to be included in a search expression. The media guidance application may search all media asset identifiers available in order to match media assets with the keyword "movies." As an example, the media guidance application may identify, based on the search, thirty movies that are scheduled for transmission to the plurality of users between 8 PM and 11 PM on Friday night and only twenty or less movies within other time periods. As a result, the media guidance application may select the 8 PM to 11 PM time interval as the time interval.

In some embodiments, the media guidance application may receive the time interval (e.g., from a user) and adjust the search to include only that time interval. Additionally or alternatively, the media guidance application may generate for display options for a user to choose a time interval. For example, the media guidance application may generate for display an option to a user to search a specific time interval every day of the week (e.g., 5 PM to 8 PM Monday-Sunday, weekend days only, weekdays only, etc.). Also, the media guidance application may recommend a time interval to the user based on the user's viewing habits (e.g., evening time, daytime, morning time, etc.).

In some embodiments, as described above, the media guidance application may generate for display search results within a grid having a time interval on one axis and representations of content sources on another axis. The media guidance application may arrange media asset identifiers according to a respective source and a respective time period. For example, the media guidance application may select representations of a user's favorite content sources to generate for display within the grid. Alternatively, the media guidance application may select to generate for display representations of content sources displayed at the time a search query is received. In another example, the media guidance application may generate for display, within the grid, representations of content sources that have media assets identified by the search scheduled to be transmitted to the plurality of users at the time the search is executed or soon thereafter, with content sources having the media assets with transmission times closer to the current time displayed more prominently.

In some embodiments, when the media guidance application generates for display the second plurality of media asset identifiers within a grid, the media guidance application may enable a user to navigate the grid to view search results scheduled for transmission via content sources, representations of which are not currently displayed. The media guidance application may receive a command (e.g., from a user) to navigate to a different plurality of content sources. For example, the media guidance application may be displaying media asset identifiers associated with five content sources (e.g., channels 1-5). The media guidance application may receive the command to navigate to a different channel set (e.g., channels 6-10). The media guidance application may then identify a third portion of the first plurality of media assets, where the third portion of the first plurality of media assets includes media assets scheduled for transmission to the plurality of users during the time interval and from the different plurality of content sources. For example, as described above, the media guidance application may receive a user command to navigate to channels 6-10 while media asset identifiers corresponding to media assets matching keyword "sports" and that are scheduled for transmission time between 8 PM and 11 PM are displayed within the grid. As a result, the media guidance application may identify media assets that match keyword "sports" on channels 6-10 during the time interval between 8 PM and 11 PM. The media guidance application may generate for display media asset identifiers corresponding to media assets scheduled for transmission on channels 6-10 between 8 PM and 11 PM and visually distinguish media asset identifiers corresponding to media assets that match "sports" and also visually distinguish media asset identifiers corresponding to media assets associated with different sports (e.g., soccer, baseball, basketball, ice hockey, etc.).

In some embodiments, when the media guidance application generates for display the second plurality of media asset identifiers within a grid, the media guidance application may enable a user to navigate the grid to view search results during different time intervals. The media guidance application may receive a command (e.g., from a user) to navigate to a different time interval. For example, the media guidance application may have generated for display media asset identifiers corresponding to media assets scheduled for transmission between 8 PM and 11 PM. The media guidance application may receive the command to navigate to a different time interval (e.g., between 5 PM and 8 PM). The media guidance application may then identify a fourth portion of the first plurality of media assets, where the fourth portion of the first plurality of media assets includes media assets scheduled for transmission to the plurality of users during the different time interval. For example, as described above, the media guidance application may receive a user command to navigate to a time interval between 5 PM and 8 PM while media asset identifiers corresponding to media assets matching keyword "sports" having a scheduled transmission time between 8 PM and 11 PM on channels 1-5, respectively, are displayed within the grid. As a result, the media guidance application may identify media assets that match keyword "sports" that are scheduled for transmission during the time interval between 5 PM and 8 PM on channels 1-5, respectively. The media guidance application may then generate for display media asset identifiers corresponding to media assets scheduled for transmission on channels 1-5 between 5 PM and 8 PM, respectively. The media guidance application may visually distinguish media asset identifiers corresponding to media assets that match keyword "sports" from media asset identifiers that do not match keyword "sports" and also visually distinguish media asset identifiers corresponding to media assets associated with different sports (e.g., soccer, baseball, basketball, ice hockey, etc.).

In some embodiments, the media guidance application may use indicators to visually distinguish those media asset identifiers that correspond to media assets that match the search expression from media asset identifiers that correspond to media assets that do not match the search expression. The media guidance application may also use different indicators to visually distinguish media asset identifiers corresponding to media assets that are associated with different attributes. The media guidance application may determine the first and second portions of the second plurality of media asset identifiers. The first portion may correspond to those media assets that match the search expression, and the second portion may correspond to media assets that do not match the search expression. The media guidance application may generate for display the first and second portions where each media asset identifier associated with the first portion includes an indicator indicating a corresponding attribute. The first media asset identifier may include a first indicator corresponding to a first attribute associated with a media asset corresponding to the first media asset identifier, and the second media asset identifier may include a second indicator corresponding to a second attribute associated with a media asset corresponding to the second media asset identifier.

For example, the media guidance application may generate for display the first portion and the second portion in such a way that every indicator in the first portion indicates an attribute of the corresponding media asset. If the media guidance application receives keyword "music" to be included in a search expression, the media guidance application may indicate media assets associated with the keyword "music" in different colors based on the genre of the media asset (e.g., rock, oldies, rap, techno, etc.) and indicate all other media asset identifiers in white or generate those media asset identifiers for display with partial transparency. The media guidance application may use other indicators to visually distinguish media asset identifiers corresponding to media assets that match the search expression based on an attribute. For example, the media guidance application may select popularity as an attribute and generate for display media asset identifiers with different transparencies based on popularity. For example, the media guidance application may generate for display media asset identifiers corresponding to more popular media assets with less transparency and media asset identifiers corresponding to media assets that are less popular with more transparency.

In some embodiments, the media guidance application may determine, based on the search expression itself, which attribute to use to visually distinguish media asset identifiers corresponding to the identified media assets. The media guidance application may first determine a type of attribute based on the search expression. For example, if the media guidance application receives keyword "sports" to be included in a search expression, the media guidance application may determine that a type of attribute based on the search expression is a type of sport associated with the identified media assets. In another example, if the search expression includes keyword "movies," the media guidance application may determine that the type of attribute based on the search expression is a genre of the movie. The media guidance application may then determine the first attribute associated with the first media asset based on the type of attribute and also determine the second attribute, different from the first attribute, associated with the second media asset based on the type of attribute. For example, if the media guidance application receives keyword "movies" to be included in a search expression, the media guidance application may determine that "genre" is the type of attribute associated with the search expression, and based on that, determine that one identified media asset is associated with a genre of "drama" and another identified media asset is associated with a genre of "comedy."

The media guidance application may then assign a first indicator to the first media asset and assign a second indicator, different from the first indicator, to the second media asset. For example, the media guidance application may assign the color "blue" to a media asset identifier corresponding to the media asset having an associated attribute of "drama" and the color "green" to a media asset identifier corresponding to the media asset having an associated attribute of "comedy." The media guidance application may then generate for display the first media asset identifier with the first indicator and the second media asset identifier with the second indicator. To continue with the example above, the media guidance application may generate for display the media asset identifier for the media asset identifier corresponding to the media asset having an associated attribute of "drama" in color "blue" and the media asset identifier corresponding to the media asset having an associated attribute of "comedy" in the color "green."

In some embodiments, the media guidance application may identify media assets scheduled for transmission to a plurality of users during a time interval and based on a search expression by utilizing a database. Specifically, the media guidance application may cross-reference the search expression with a database listing media assets, attributes corresponding to those media assets, and scheduled times corresponding to those media assets. For example, if the media guidance application receives keyword "sit-coms" to be included in the search expression, the media guidance application may compare "sit-coms" with listings of media assets in the database in order to determine which media assets in the database match that keyword. As a result, the media guidance application may identify, based on the cross-referencing, those media assets that match the search expression. The media guidance application may then retrieve, from the database, a scheduled transmission time associated with each identified media asset, and identify the time interval based on a time period, including the largest number of the identified media assets. For example, as described above, the media guidance application may identify, based on the search, thirty movies that are scheduled for transmission to the plurality of users between 8 PM and 11 PM on Friday night and only twenty or less movies within other time periods. As a result, the media guidance application may select Friday 8 PM to 11 PM time interval as the time interval. The media guidance application may then select, from the identified media assets, those media assets that match the search expression as the first plurality of media assets.

In some embodiments, the media guidance application may enable a user to view information associated with a media asset that was identified as part of the search. Specifically, the media guidance application may, based on a user selection of the first media asset identifier, generate for display information associated with the first attribute. For example, if the media guidance application receives keyword "music" to be included in the search expression, the media guidance application may generate for display media asset identifiers corresponding to media assets that are associated with keyword "music." The media guidance application may also visually distinguish media asset identifiers corresponding to the identified media assets based on the genre associated with the identified media assets (e.g., rock, rap, techno, etc.). The media guidance application may then receive a user selection of one of the media asset identifiers and generate for display information related to the genre of the media asset.

In some embodiments, the media guidance application may enable a user to instruct the media guidance application to store a search expression in order to execute the same search in the future. The media guidance application may enable a user to indicate to the media guidance application whether to store the search expression with or without specifying the time interval to search. Specifically, the media guidance application may generate for display a plurality of options where the plurality of options enables a user to define the search expression and the time interval. As stated above, the media guidance application may or may not generate for display an option to the user to select the time interval. The media guidance application may receive user input defining the search expression and the time interval. Additionally, if the media guidance application generates for display a selection of the time interval, the media guidance application may or may not require the user to select a specific time interval in addition to the search expression.

The media guidance application may then receive user input defining the search expression and the time interval. As described above, the media guidance application may receive the search expression with or without the time interval. The media guidance application may store, in a database, the defined search expression and the time interval if the time interval is received. The media guidance application may then, based on a user command to execute a search based on the stored search expression, retrieve the stored search expression and the stored time interval from the database. The media guidance application may or may not retrieve from the database the time interval. The media guidance application may then identify, based on the search expression, a second plurality of media assets that is scheduled for transmission to the plurality of users during the defined time interval. If the media guidance application determines that the time interval was not input by the user, the media guidance application may determine the time interval in any fashion described above.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of illustrative steps involved in providing search results to a user, in accordance with some embodiments of the disclosure.

DESCRIPTION

Figure 1:
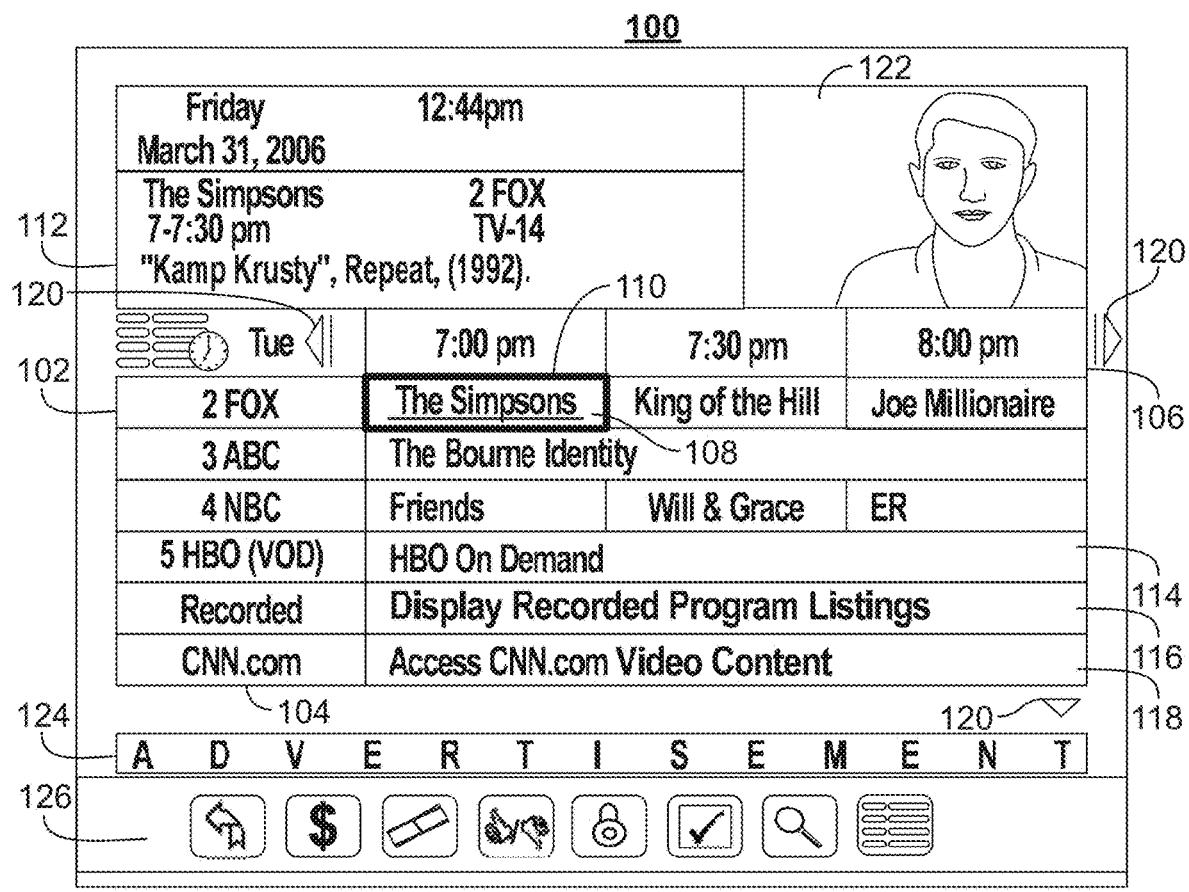
FIG. 1 shows an illustrative embodiment of a display screen that may be used to provide media guidance application listings and other media guidance information, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
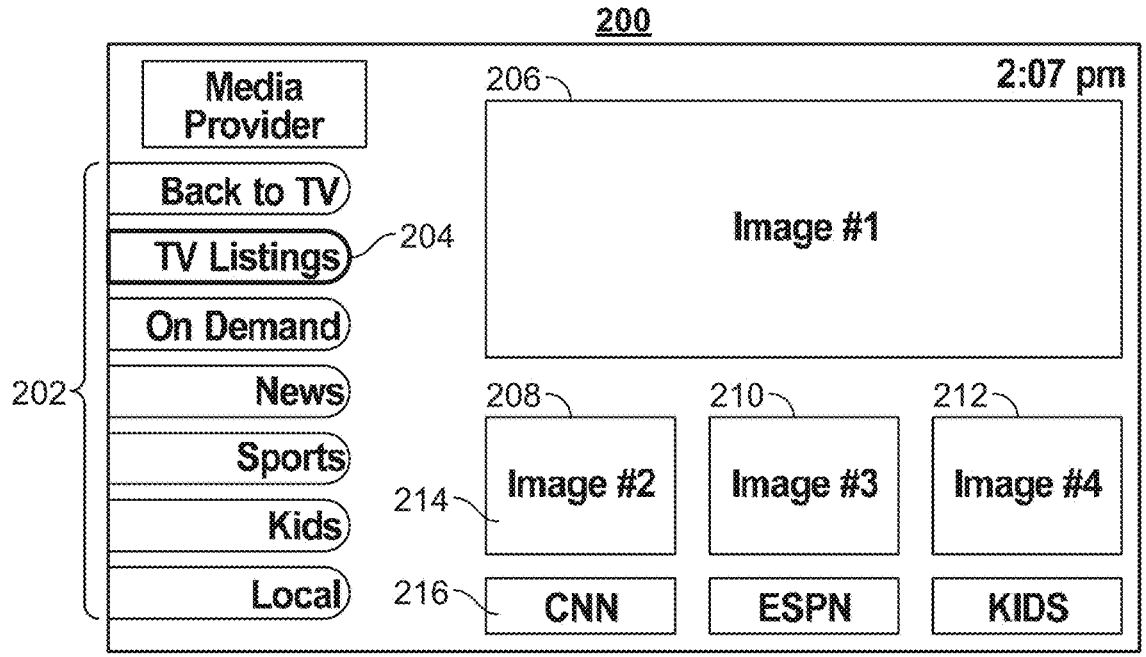
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
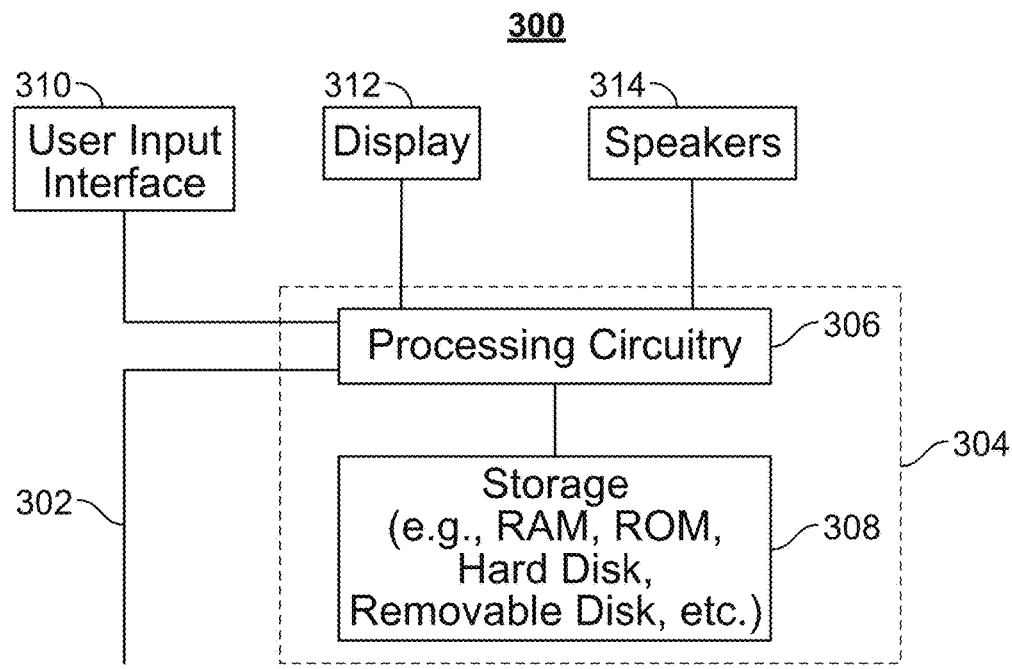
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
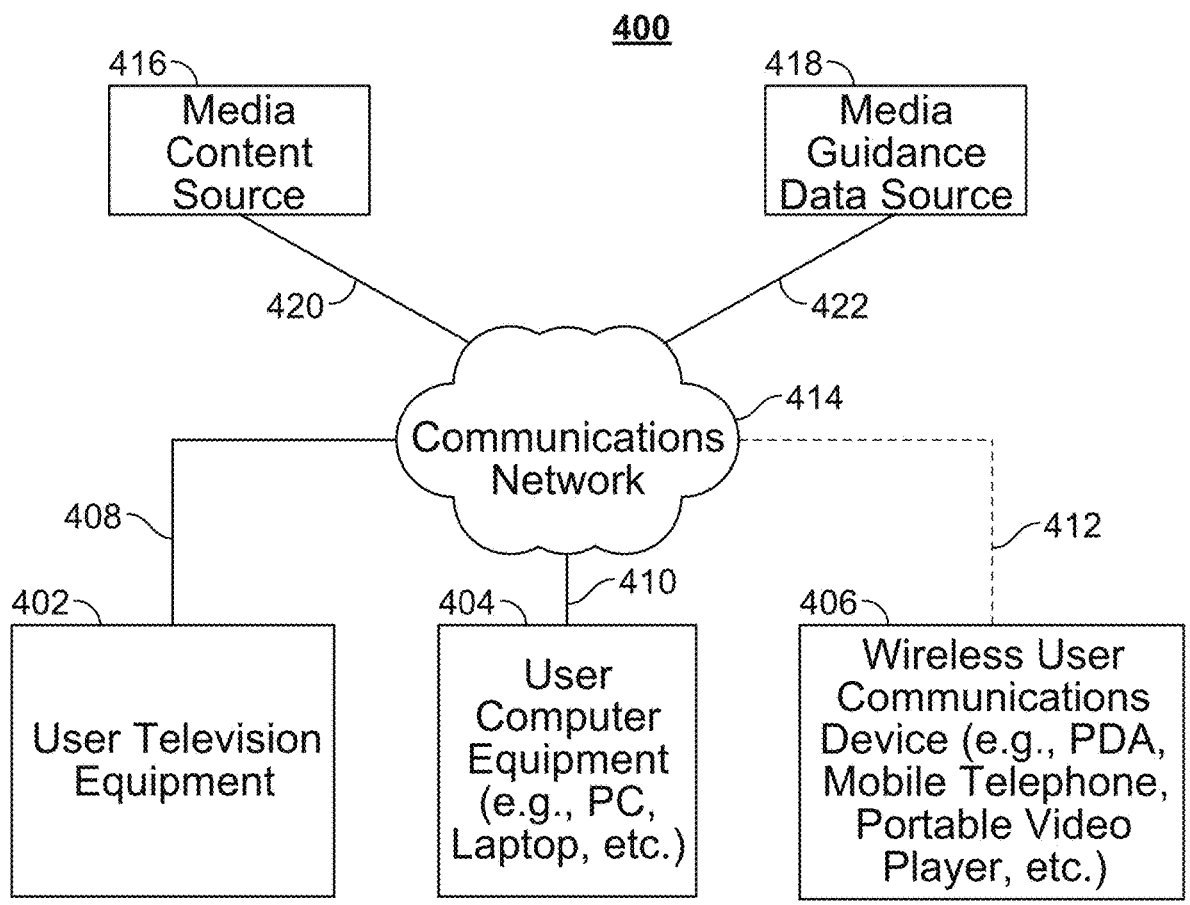
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may present content to a user that the user is interested in. Specifically, the media guidance application may identify, based on a search expression, a first plurality of media assets that is scheduled for transmission to a plurality of users during a time interval. As referred to herein, the term "search expression" refers to one or more symbols, numbers, selections, and/or letters that may be used in order to identify media assets. For example, search a expression may include keywords made up of letters, numbers and/or symbols. A search expression may also include a selection of one more elements on a screen (e.g., options selected by a user that represent genres of media assets to search for).

The media guidance application may be implemented on a user device that includes components of device 300 (FIG. 3). The media guidance application may be implemented on any user device such as devices 402, 404, or 406 (FIG. 4). The media guidance application may have access to media assets and media asset identifiers. The media asset may be stored locally in storage 308. Alternatively or additionally, media assets may be stored at media content source 416 and/or media guidance data source 418. Media asset identifiers may also be stored at media content source 416 and/or media guidance data source 418. The media guidance application may retrieve media asset identifiers from media content source 416 and/or media guidance data source 418 through communications network 414. The media guidance application may also retrieve media asset identifiers from media content source 416 and/or media guidance data source 418. The media guidance application may generate for display media asset identifiers to be displayed on display 312 or on a display that is external to the device where the media guidance application is implemented (e.g., device 402, 404 and/or any device 406).

For example, the media guidance application may identify the first plurality of media assets by comparing the search expression with metadata associated with the media assets. The metadata may be included as part of the media asset identifiers associated with the media assets, respectively, that may be stored locally in storage 308. Alternatively or additionally, media asset identifiers may be stored at media content source 416 and/or media guidance data source 418, which can be accessed over communications network 414. The media guidance application may retrieve the media asset identifiers from media content source 416 and/or media guidance data source 418 in order to compare the search expression with the media asset identifiers. In another example, the media guidance application may transmit the search expression to a remote server (e.g., media content source 414 and/or media guidance data source 418) where the media assets that match the search expression may be identified. The media guidance application may receive back from the server (e.g., media content source 414 and/or media guidance data source 418) media asset identifiers that match the search expression. If the media guidance application determines that only one element is included in the search expression (e.g., a keyword), the media guidance application may compare the keyword to the media asset identifiers or other metadata associated with the media asset in order to find a match for the keyword. If the media guidance application determines several elements that are included in the search expression (e.g., a keyword and a type of media asset), the media guidance application may identify media assets based on matching both elements included in the search expression. Alternatively, the media guidance application may identify media assets that match one or both elements included in the search expression to be included in the first plurality of media assets.

Figure 5:
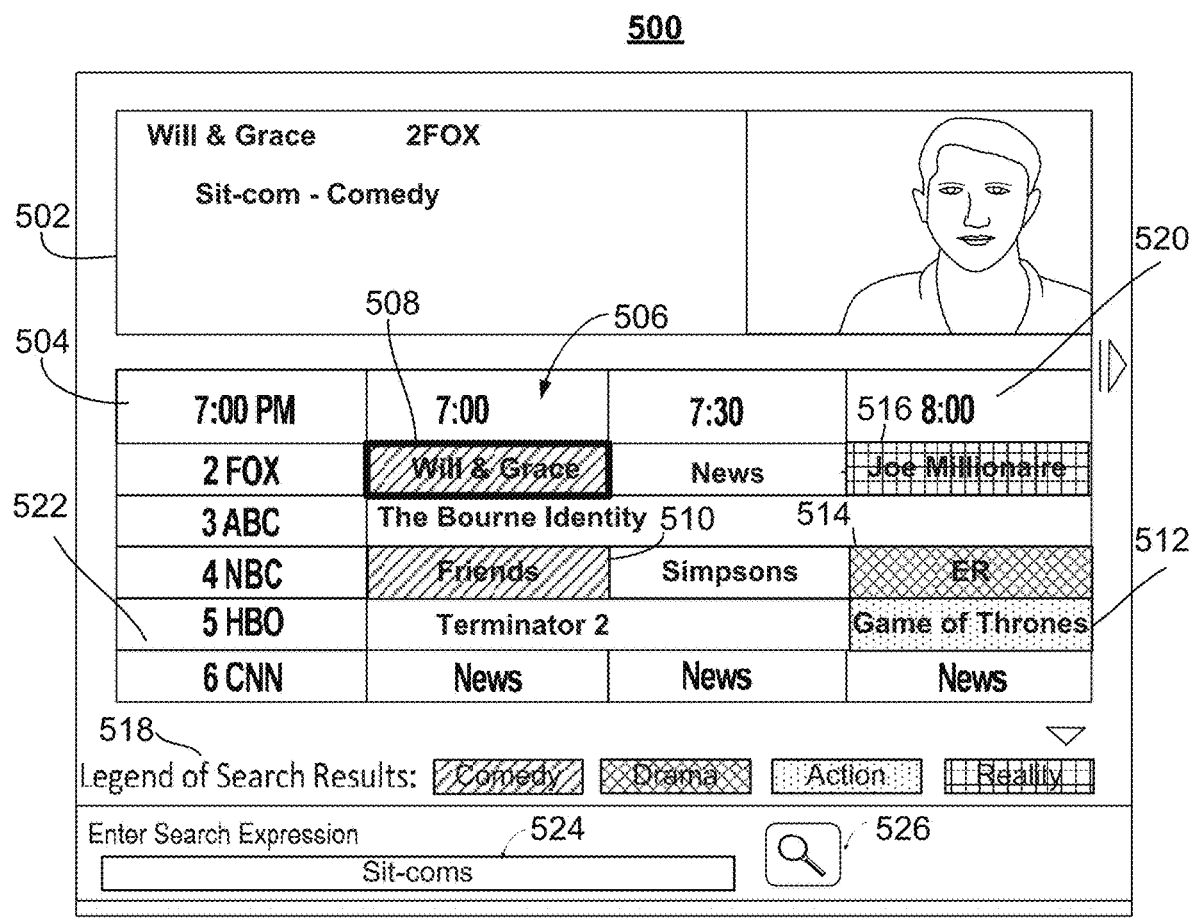
FIG. 5 shows an illustrative embodiment of a display screen to provide search results, in accordance with some embodiments of the disclosure.

FIG. 5 illustrates one method that a media guidance application may receive a search expression. In FIG. 5, the media guidance application may enable a user to input keywords (e.g., via user device 310 (FIG. 3) into input area 524. The media guidance application may accept input from user input interface 310, which may accept commands from user input devices (e.g., keyboard, mouse, remote control, etc.). The media guidance application may then wait for the user to select icon 526 in order to execute the search. Alternatively or additionally, the media guidance application may execute the search through an input from one of the user devices mentioned above (e.g., user pressing a key on the keyboard, remote control and/or a mouse).

The media guidance application may then generate for display (e.g., via control circuitry 304 on display 312) a second plurality of media asset identifiers corresponding to media assets that are scheduled for transmission to the plurality of users during the time interval. The media guidance application may generate for display the second plurality of media asset identifiers on display 312. Alternatively or additionally, the media guidance application may generate for display the media asset identifiers on a display associated with another device (e.g., any of device 402, 404, and/or 406 (FIG. 4)).

FIG. 5 illustrates one way that the media guidance application may generate for display the second plurality of media asset identifiers. The media guidance application may generate for display screen 500. Screen 500 may include clock 504 that displays the current time. Horizontal axis 520 displays time periods within a time interval (e.g., time period 506 corresponding to 7:00). FIG. 5 shows time periods of 7:00 to 7:30 and 7:30 to 8:00 within the time interval between 7:00 and 8:00. Vertical axis 522 displays content sources (e.g., Fox, ABC, etc.). As described above, content sources may include Internet sources (e.g., CNN.com 118 (FIG. 1)), Video-on-Demand sources (e.g., HBO On Demand 114 (FIG. 1)), recorded programs (e.g., recorded program listings 116 (FIG. 1)), etc.

The media guidance application may visually distinguish a first portion of the second plurality of media asset identifiers, corresponding to the first plurality of media assets identified based on the search expression, from a second portion of the second plurality of a media asset identifiers corresponding to media assets not identified based on the search expression. For example, the media guidance application may indicate media asset identifiers corresponding to media assets identified based on the search expression differently from the media asset identifiers corresponding to media assets that were not identified based on the search expression. FIG. 5 illustrates those distinctions. In FIG. 5, media asset identifiers that correspond to media assets identified based on the search expression (e.g., media asset identifiers 508, 510, 512, 514, and 516) are indicated by different types of shading and media assets that were not identified based on the search expression (e.g., "Simpsons," "Terminator 2," etc.) have not been shaded at all.

The media guidance application may also visually distinguish a first media asset identifier in the first portion from a second media asset identifier in the first portion based on a first attribute associated with a first media asset corresponding to the first media asset identifier and a second attribute associated with a second media asset corresponding to the second media asset identifier. As referred to herein, the term "attribute associated with a media asset" refers to any characteristic of a media asset. As referred to herein, the term "type of attribute associated with a media asset" refers to a grouping of attributes that may be associated with different media assets. For example, some types of attributes may include quality, genre, program type, etc. Genres may include action, comedy, adventure, drama, etc., which are attributes associated with media assets. Program type may include news, movies, cartoons, documentaries, etc., which are also attributes associated with different media assets.

Continuing with the example above, in FIG. 5 media asset identifier 508 and media asset identifier 514 are shaded differently based on media asset ("Will & Grace") corresponding to media asset identifier 508 being associated with a "comedy" genre and media asset ("ER") corresponding to media asset identifier 514 being associated with a "drama" genre. The media guidance application may base the shading on the genre of the media assets identified based on the search expression, as exemplified in legend 518. In addition, FIG. 5 shows area 502 that is associated with the currently selected media asset identifier 508. The media guidance application may generate for display inside area 502 data associated with the media asset corresponding to selected media asset identifier 508. For example, as shown in FIG. 5, area 502 may display the name associated with the media asset as well as a representation of a content source making the media asset available. The media guidance application may also, based on a user selection of the first media asset identifier, generate for display information associated with the first attribute inside area 502. For example, FIG. 5 illustrates that the media guidance application selected genre as the type of attribute to visually distinguish media asset identifiers corresponding to the media assets identified based on the search expression and that the currently selected media asset identifier corresponds to a media asset that has an associated genre of "comedy."

In some embodiments, the media guidance application may enable a user to enter a search expression and, based on the search expression entered, identify the time interval where the time interval is based on a number of media assets matching that search expression that are scheduled to be transmitted to the user during that time interval. Specifically, the media guidance application may receive the search expression from the user. For example, as described above, the media guidance application may receive the search expression through user input interface 310 (FIG. 3) via a user input device (e.g., keyboard, mouse, remote control, voice input, etc.). In another example, the media guidance application may receive the search expression from media content source 416 and/or media guidance data source 418 via communications network 414. Alternatively or additionally, the media guidance application may receive the search expression from another device (e.g., user television equipment 402, user computer equipment 404, and/or any wireless communication device 406).

The media guidance application may then perform a search of media assets that are scheduled for transmission to the plurality of users. For example, as described above, the media guidance application may have received keyword "news" to be included in the search expression. The media guidance application may compare keyword "news" with text that is included as part of metadata associated with each media asset (e.g., program listing, etc.). The metadata may reside in a database that lists media assets and information associated with each media asset (e.g., title, director, actors, genre, type of media asset, etc.). The media guidance application may directly access the database via control circuitry 304 if the database resides in storage 308. However, the media guidance application may access the database via communications network 414, if the database resides on a remote server (e.g., media content source 416 and/or media guidance data source 418). It should be noted that the database may be distributed between any of storage 308 (FIG. 3), media content source 416 (FIG. 4), and/or media guidance data source 418 (FIG. 4).

In some embodiments, the media guidance application may transmit the search expression to a remote server (e.g., media content source 416 and/or media guidance data source 418) and receive back media asset identifiers associated with media assets that match the search expression. Media asset identifiers may include alphanumeric strings that in turn may include the title of the media asset, if the media asset is part of the series, an episode number, etc. A media asset identifier may also include a hash that may be derived from a combination of attributes associated with the media asset (e.g., title, release data, episode number, etc.). When the media guidance application receives media asset identifiers corresponding to media assets identified by the search, the media guidance application may then compare those media asset identifiers to locally stored media asset identifiers to determine which media asset identifiers to generate for display.

The media guidance application may then determine the time interval, where the time interval corresponds to a time period that includes a largest number of media assets that are found based on the search expression. For example, the media guidance application may retrieve the scheduled start and end times for each media asset identified based on the search expression. The media guidance application may then determine which time period is associated with the largest number of identified media assets scheduled for transmission. For example, the media guidance application may build a table of one-hour time periods for the upcoming week. The media guidance application may then iterate through the media assets identified based on the search and fill in the time periods during which each media asset is scheduled for transmission. When the media guidance application finishes filling in the time periods, the media guidance application may select the time period that has the most entries. The media guidance application may then determine the time interval by expanding the time period to what can be displayed on a display (e.g., display 312). For example, if the media guidance application determines that a three-hour time interval can be displayed, then the media guidance application may expand the one-hour time period by one hour prior to the time period and one hour after the time period to determine a three-hour time interval.

The media guidance application may then identify the first plurality of media assets that is scheduled for transmission to the plurality of users during the time interval. The media guidance application may make the identification of the media assets scheduled for transmission during the time interval via any of the methods described above (e.g., metadata comparison, etc.).

In some embodiments, the media guidance application may also select which representations of content sources to generate for display along with media asset identifiers corresponding to media assets scheduled for transmission by those content sources. As described above, the media guidance application may generate for display representations of content sources that are displayed at the time the search is executed along with media asset identifiers corresponding to media assets that are scheduled for transmission from those content sources during the time interval. In another example, the media guidance application may generate for display representations of user's favorite content sources together with the media asset identifiers corresponding to media assets that are scheduled for transmission from those content sources during the time interval. Additionally or alternatively, the media guidance application may select content sources that are associated with media assets scheduled for transmission during the time interval and that have been identified based on the search expression. For example, if representations of channels 1-5 have been generated for display together with media asset identifiers corresponding to media assets that are scheduled for transmission on those channels during the time interval and the media assets that match the search expression are not scheduled for transmission on channels 4 and 5, the media guidance application may replace representations of channels 4 and 5 as well as media asset identifiers corresponding to those channels with two different channels that have media assets scheduled for transmission during the time interval.

In some embodiments, the media guidance application may enable a user to navigate to a different time interval and present to the user media asset identifiers corresponding to media assets identified based on the search expression that are scheduled for transmission during the different time interval. Specifically, the media guidance application may receive a command (e.g., from a user) to navigate to a different time interval. The media guidance application may receive the command via any methods described above (e.g., via a keyboard, a mouse, a remote control, or any other input device). Any user input device that is able to communicate with user input interface 310 may be used.

The media guidance application may then identify a fourth portion of the first plurality of media assets, where the fourth portion of the first plurality of media assets comprises media assets scheduled for transmission to the plurality of users during the different time interval and from the plurality of content sources. For example, the media guidance application may have received a user command (e.g., via a right arrow press on a remote control) to navigate to the next time interval. The media guidance application may then retrieve media asset identifiers corresponding to media assets that were identified based on the search expression, but for the next time interval. The media guidance application may then generate for display those media asset identifiers along with media asset identifiers that are scheduled for the next time interval that have not been identified based on the search expression. As described above, the media guidance application may visually distinguish the media asset identifiers corresponding to media assets that were identified based on the search expression from the media asset identifiers that correspond to media assets that were not identified based on the search expression.

In some embodiments, the media guidance application may enable a user to navigate to a different plurality of content sources and present to the user media asset identifiers corresponding to media assets identified based on the search expression that are scheduled for transmission from the different plurality of content sources. The media guidance application may receive a command to navigate to a different plurality of content sources. The media guidance application may receive the command in the same manner as the command to navigate to a different time interval. The media guidance application may then identify a third portion of the first plurality of media assets, where the third portion of the first plurality of media assets comprises media assets scheduled for transmission to the plurality of users during the time interval and from the different plurality of content sources. The media guidance application may perform the identification in the same manner as described above.

In some embodiments, the media guidance application may use indicators in order to visually distinguish media asset identifiers that correspond to media assets identified based on a search expression from media asset identifiers that correspond to media assets that were not identified based on the search expression. The media guidance application may also use different indicators to visually differentiate media asset identifiers that were identified based on the search expression from each other based on an attribute. For example, the media guidance application may determine that media asset identifiers based on a search expression are to be differentiated based on genre. The media guidance application may determine that five specific genres are available to visually differentiate (e.g., action, drama, comedy, thriller, and horror). The media guidance application may then determine what type of indicators to use for genre. For example, the media guidance application may determine that colors are to be used for different genres. Additionally or alternatively, the media guidance application may determine that different shadings of media asset identifiers are to be used. In another example, different geographical shapes may be used and, in yet another example, alpha-numeric text or symbols may be used. The media guidance application may use any combination of the above indicators to visually differentiate the media asset identifiers. The media guidance application may determine which type of indicators to use based on, for example, user's preferences, whether explicitly indicated or implicitly determined by the media guidance application. Additionally or alternatively, the media guidance application may determine the type of indicators to use in a random manner.

The media guidance application may then determine which attribute to assign to each indicator (e.g., horror to color "red"). The media guidance application may make the determination based on a user preference or randomly. It should be noted that the media guidance application may make the selection in any other manner. For example, a content provider may program the media guidance application to always use the same method. Specifically, the content provider may program the media guidance application to use different colors for different genres.

In some embodiments, the media guidance application may determine a type of attribute to use based on the search expression. For example, the media guidance application may receive keyword "movies" to be included in the search expression. The media guidance application may cross-reference the keyword "movies" with a database that lists keywords and possible attribute types for those keywords. The media guidance application may, based on the cross-referencing, select a genre as the type of attribute to use to visually differentiate media asset identifiers. Additionally or alternatively, the media guidance application may, based on the cross-referencing, select quality as the attribute. In some embodiments the media guidance application may select both genre and quality and also select different types of indicators to represent both. For example, if the media guidance application selects genre and quality as attributes to visually differentiate media asset identifiers by, the media guidance application may differentiate different genres through color (e.g., media asset identifiers associated with horror movies in red color) and different quality through shading (e.g., vertical lines for HD quality movies and horizontal for SD quality movies). The media guidance application may apply both differentiators where a media asset identifier for a horror HD movie would be generated for display in red and shaded vertically.

In some embodiments, the media guidance application may enable a user to define a search expression and store it for later use. Specifically, the media guidance application may generate for display (e.g., via control circuitry 304 on display 312) a plurality of options, where the plurality of options enables a user to define the search expression and the time interval. For example, the media guidance application may generate for display a screen that may include selectable options for genre, release year, episode number, etc., in order to define the search expression. In addition, the media guidance application may generate for display areas where keywords may be entered such as to search titles, actors, directors, writers, etc. Additionally or alternatively, the media guidance application may generate for display time intervals that a user may select. Time interval choices were described above. The media guidance application may retrieve these options from a database (e.g., in storage 308, at media content source 416, and/or media guidance data source 418) or they may be programmed into the media guidance application.

The media guidance application may then receive user input defining the search expression and the time interval. Methods of receiving user input have been described at length above. The media guidance application may then store (via control circuitry 304), in a database, the defined search expression and the time interval. As described above, the database may be placed locally in storage 308 or on a remote server (e.g., media content source 416 and/or media guidance data source 418). The database may be distributed as described above. The media guidance application may, based on a user command to execute a search based on the stored search expression, retrieve (e.g., via control circuitry 304) the stored search expression and the stored time interval from the database. The media guidance application may then identify (e.g., via control circuitry 304), based on the search expression, a second plurality of media assets that is scheduled for transmission to the plurality of users during the defined time interval.

FIG. 6 is a flowchart of illustrative steps involved in providing search results to a user. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, a media guidance application identifies (e.g., via control circuitry 304), based on a search expression, a first plurality of media assets that is scheduled for transmission to a plurality of users during a time interval. For example, as discussed above, the media guidance application may search through media asset identifiers and/or a database listing media assets and media asset attributes in order to identify media assets based on the search expression.

At step 604, the media guidance application generates for display (e.g., via control circuitry 304 on display 312 (FIG. 3)) a second plurality of media asset identifiers corresponding to media assets that is scheduled for transmission to the plurality of users during the time interval. For example, as discussed above, the media guidance application may generate for display screen 500 (FIG. 5).

At step 606, the media guidance application visually distinguishes (e.g., via control circuitry 304 on display 312 (FIG. 3)) a first portion of the second plurality of media asset identifiers, corresponding to the first plurality of media assets identified based on the search expression, from a second portion of the second plurality of media asset identifiers corresponding to media assets not identified based on the search expression, where a first media asset identifier in the first portion is visually distinguished from a second media asset identifier in the first portion based on a first attribute associated with a first media asset corresponding to the first media asset identifier and a second attribute associated with a second media asset corresponding to the second media asset identifier. For example, FIG. 5 illustrates one possible embodiment of the visual distinction.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
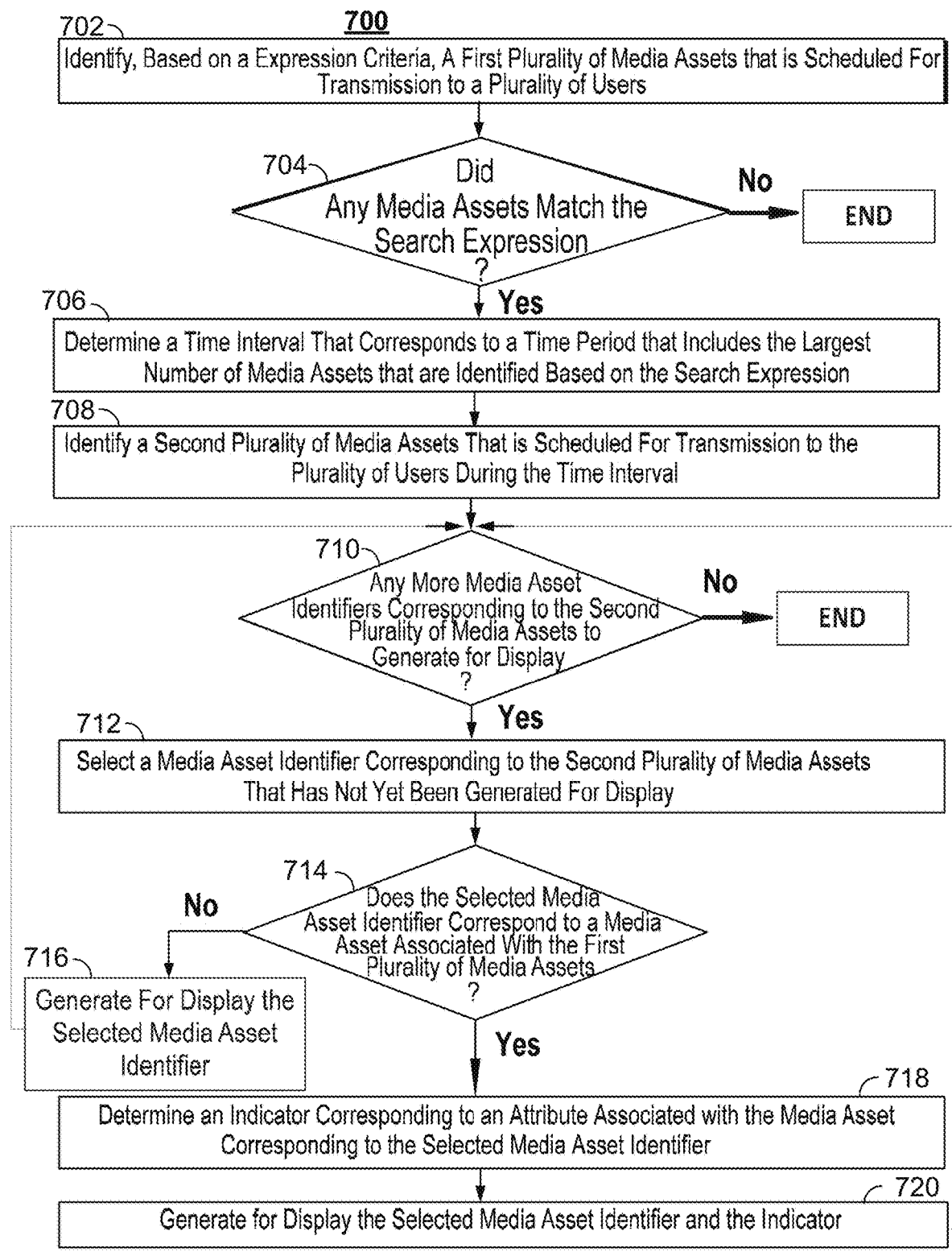
FIG. 7 is a flowchart of illustrative steps involved in providing further details for providing search results to a user, in accordance with some embodiments of the disclosure.

FIG. 7 is a flowchart of illustrative steps involved in providing further details for providing search results to a user. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At step 702, the media guidance application identifies (e.g., via control circuitry 304), based on a search expression, a first plurality of media assets that is scheduled for transmission to a plurality of users. As described above, the media guidance application may compare media asset identifiers corresponding to media assets with the search expression in order to identify media assets that match the search expression. Additionally or alternatively, the media guidance application may cross-reference the search expression with a database located in storage 308, media content source 416, and/or media guidance data source 418 in order to identify those media assets that match the search expression. The media guidance application may store media asset identifiers corresponding to media assets that were identified based on the search expression in storage 308. Additionally or alternatively, the media guidance application may tag media assets that were identified based on the search expression with a flag. In yet another embodiment, the media guidance application may store references and/or pointers to media asset identifiers identified for the first plurality of media assets in a data structure.

At step 704, the media guidance application determines (e.g., via control circuitry 304) whether any media assets were identified based on the search expression. The media guidance application may access storage 308, media content source 416 and/or media guidance data source 418 in order to determine if any media assets were identified based on the search expression. Specifically, the media guidance application may have stored media asset identifiers corresponding to media assets that were identified based on the search expression in a data structure. The media guidance application may, upon storing the media asset identifiers in the data structure, increment a counter stored in storage 308 in order to determine the number of media assets that were matched based on the search expression. The media guidance application may, at this time, retrieve the value associated with the counter to determine if any media assets were identified based on the search expression. If the media guidance application does not identify any media assets based on the search expression, the process ends. If the media guidance application identifies at least one media asset based on the search expression, the process moves to step 706.

At step 706, the media guidance application determines (e.g., via control circuitry 304) a time interval that corresponds to a time period that includes the largest number of media assets that are identified based on the search expression. The media guidance application may make the determination via any methods described above (e.g., by building a table in storage 308, at media content source 416 and/or media guidance data source 418).

At step 708, the media guidance application may identify (e.g., via control circuitry 304) a second plurality of media assets that is scheduled for transmission to the plurality of users during the time interval. Specifically, the media guidance application may cross-reference the time interval with a database listing media assets and their respectively scheduled transmission times. For example, the media guidance application may iterate through each media asset in the database and compare the scheduled start time and the scheduled end time of each media asset to the start time and the end time of the time interval. If the media guidance application finds an overlap, the media guidance application may, for example, store a reference with the media asset identifier corresponding to the media asset where the reference identifies the media asset as belonging to the second plurality of media assets.

At step 710, the media guidance application determines (e.g., via control circuitry 304) whether any more media asset identifiers associated with media assets corresponding to the second plurality of media assets are to be generated for display. If the media guidance application determines that no more media asset identifiers are to be generated for display, the process ends. If the media guidance application determines that more media asset identifiers are to be displayed, then the process moves to step 712. The media guidance application may make that determination by, for example, accessing in storage 308 the references that were created as part of step 708.

At step 712, the media guidance application selects (e.g., via control circuitry 304) a media asset identifier corresponding to the second plurality of media assets that has not yet been generated for display. The media guidance application may, for example, have stored the media asset identifiers corresponding to media associated with the second plurality of media assets in a data structure. The media guidance application may select one of the media asset identifiers from the data structure to generate for display.

At step 714, the media guidance application determines (e.g., via control circuitry 304) whether the selected media asset identifier corresponds to a media asset that is associated with the first plurality of media assets. The media guidance application may make the determination based on a tag, a flag or a data structure described in step 702. If the media guidance application determines that the media asset identifier does not correspond to a media asset associated with the first plurality of media assets, the process moves to step 716. If the media guidance application determines that the media asset identifier does correspond to a media asset associated with the first plurality of media assets, the process moves to step 718.

At step 716, the media guidance application generates for display (e.g., via control circuitry 304 on display 312) the selected media asset identifier. As part of this step, the media guidance application may update the data structure of step 710 that includes media asset identifiers to generate for display by removing the selected media asset identifier from the data structure. At this point, the process moves forward to step 710. For example, FIG. 5 illustrates generating for display a media asset identifier corresponding to a selected media asset that is not identified based on the search expression. In FIG. 5, the media asset identifiers for "The Bourne Identity" and for "Terminator" are generated for display free of any indicators.

At step 718, the media guidance application determines (e.g., via control circuitry 304) an indicator corresponding to an attribute associated with the media asset corresponding to the selected media asset identifier. As indicated by Legend of Search Results 518 (FIG. 5), the media guidance application may select different shadings for different attributes (e.g., media asset identifiers for comedies being shaded with titled lines). In order to make the determination, the media guidance application may access a database that may be located in storage 308 or on a remote server (e.g., media content source 416 and/or media guidance data source 418) that lists media asset attributes and their corresponding indicators. Additionally or alternatively, the media guidance application may make the determination on the fly (via control circuitry 304) by, for example, randomly determining the indicator from a list of possible indicators. The media guidance application may also determine the indicator based on user preferences, which may have been explicitly specified by the user or determined by the media guidance application.

At step 720, the media guidance application generates for display (e.g., via control circuitry 304 on display 312) the selected media asset identifier and the indicator. As part of this step, the media guidance application may update the data structure of step 710 that includes media asset identifiers to generate for display by removing the selected media asset identifier from the data structure. At this point, the process moves forward to step 710.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Furthermore, as referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

What is claimed is:

1. A method for presenting media asset identifiers, the method comprising:
   identifying a time period that includes a largest number of media assets scheduled for transmission with metadata that includes a keyword;
   identifying a first plurality of media assets with metadata that includes the keyword that are scheduled for transmission during the identified time period;
   identifying a second plurality of media assets with metadata that does not include the keyword that are scheduled for transmission during the identified time period;
   generating for display a first plurality of media asset identifiers of the first plurality of media assets; and
   generating for display a second plurality of media asset identifiers of the second plurality of media assets, wherein the second plurality of media asset identifiers is visually distinguished from the first plurality of media asset identifiers.

2. The method of claim 1, furthers comprising:
   generating for display a first plurality of content source indicators corresponding to a plurality of content sources along a first axis; and
   wherein, generating for display the first plurality of media asset identifiers comprises:
      generating for display a portion of the first plurality of indicators corresponding to a plurality of time periods along a second axis, wherein the plurality of time periods is within the time period;
      arranging the displayed first plurality of media asset identifiers according to a respective source and a respective time period.

3. The method of claim 2, further comprising:
   receiving a command to navigate to a different plurality of content sources;
   identifying a third plurality of media assets, wherein the third plurality of media assets comprises media assets scheduled for transmission during the time period from the different plurality of content sources; and
   generating for display a third plurality of media asset identifiers corresponding to the third plurality of media assets.

4. The method of claim 2, further comprising:
   receiving a command to navigate to a different time period;
   identifying a fourth plurality of media assets, wherein the fourth plurality of media assets comprises media assets scheduled for transmission during the different time period and from the plurality of content sources; and
   generating for display a forth plurality of media asset identifiers corresponding to the fourth plurality of media assets.

5. The method of claim 1:
wherein generating for display the first plurality of media asset identifiers comprises generating for display, for each media asset identifier in first plurality of media asset identifiers, an indicator corresponding to first attribute associated with a respective media asset identifier; and
wherein generating for display the second plurality of media asset identifiers comprises generating for display, for each media asset identifier in second plurality of media asset identifiers, an indicator corresponding to second attribute associated with a respective media asset identifier, wherein the second attribute is different from the first attribute.

6. The method of claim 1, wherein identifying the first plurality of media assets comprises:
comparing a search expression with each media asset in a database listing media assets attributes corresponding to those media assets, and scheduled times corresponding to those media assets;
identifying, based on the comparing, those media assets that match the search expression;
retrieving, from the database, a scheduled transmission time associated with each identified media asset;
identifying a time period comprising the largest number of the identified media assets; and
selecting, from the identified media assets that match the search expression, the first plurality of media assets.

7. The method of claim 1, wherein identifying media assets that are scheduled for transmission comprises:
generating for display a plurality of options, wherein the plurality of options enables a user to define a search expression;
receiving user input defining the search expression;
storing, in a database, the defined search expression;
based on a user command to execute a search based on the stored search expression, retrieving the stored search expression; and
performing a search for media assets based on the stored search expression.

8. The method of claim 1, wherein visually distinguishing the second plurality of media asset identifiers from the first plurality of media asset identifiers comprises:
generating for display the first plurality of media asset identifiers using a first color; and
generating for display the second plurality of media asset identifiers using a second color, different from the first color.

9. The method of claim 1, wherein visually distinguishing the second plurality of media asset identifiers from the first plurality of media asset identifiers comprises:
generating for display the first plurality of media asset identifiers as having a first shape; and
generating for display the second plurality of media asset identifiers as having a second shape, different from a first shape.

10. The method of claim 1, wherein visually distinguishing the second plurality of media asset identifiers from the first plurality of media asset identifiers comprises:
generating for display the first plurality of media asset identifiers using a first font; and
generating for display the second plurality of media asset identifiers using a second font, different from the first font.

11. A system for presenting media asset identifiers, the system comprising:
control circuitry configured to:
identify a time period that includes a largest number of media assets scheduled for transmission with metadata that includes a keyword;
identify a first plurality of media assets with metadata that includes the keyword that are scheduled for transmission during the identified time period;
identify a second plurality of media assets with metadata that does not include the keyword that are scheduled for transmission during the identified time period; and
output circuitry configured to:
generate for display a first plurality of media asset identifiers of the first plurality of media assets; and
generate for display a second plurality of media asset identifiers of the second plurality of media assets, wherein the second plurality of media asset identifiers is visually distinguished from the first plurality of media asset identifiers.

12. The system of claim 11, wherein the output circuitry is configured to:
generate for display a first plurality of content source indicators corresponding to a plurality of content sources along a first axis; and
wherein, generating for display the first plurality of media asset identifiers comprises:
generating for display a portion of the first plurality of indicators corresponding to a plurality of time periods along a second axis, wherein the plurality of time periods is within the time period;
arranging the displayed first plurality of media asset identifiers according to a respective source and a respective time period.

13. The system of claim 12,
wherein the control circuitry is configured to:
receive a command to navigate to a different plurality of content sources;
identify a third plurality of media assets, wherein the third plurality of media assets comprises media assets scheduled for transmission during the time period from the different plurality of content sources; and
wherein the output circuitry is configured to generate for display a third plurality of media asset identifiers corresponding to the third plurality of media assets.

14. The system of claim 12,
wherein the control circuitry is configured to:
receive a command to navigate to a different time period;
identify a fourth plurality of media assets, wherein the fourth plurality of media assets comprises media assets scheduled for transmission during the different time period and from the plurality of content sources; and
wherein the output circuitry is configured to generate for display a forth plurality of media asset identifiers corresponding to the fourth plurality of media assets.

15. The system of claim 11:
wherein the output circuitry is configured to generate for display the first plurality of media asset identifiers by generating for display, for each media asset identifier in first plurality of media asset identifiers, an indicator corresponding to first attribute associated with a respective media asset identifier; and wherein the output circuitry is configured to generate for display the second plurality of media asset identifiers by generating for display, for each media asset identifier in second plurality of media asset identifiers, an indicator corresponding to second attribute associated with a respective media asset identifier, wherein the second attribute is different from the first attribute.

16. The system of claim 11, wherein the control circuitry is configured to identify the first plurality of media assets by:
comparing a search expression with each media asset in a database listing media assets attributes corresponding to those media assets, and scheduled times corresponding to those media assets;
identifying, based on the comparing, those media assets that match the search expression;
retrieving, from the database, a scheduled transmission time associated with each identified media asset;
identifying a time period comprising the largest number of the identified media assets; and
selecting, from the identified media assets that match the search expression, the first plurality of media assets.

17. The system of claim 11, wherein the control circuitry is configured to identify media assets that are scheduled for transmission by:
generating for display a plurality of options, wherein the plurality of options enables a user to define a search expression;
receiving user input defining the search expression;
storing, in a database, the defined search expression;
based on a user command to execute a search based on the stored search expression, retrieving the stored search expression; and
performing a search for media assets based on the stored search expression.

18. The system of claim 11, wherein the output circuitry is configured to visually distinguish the second plurality of media asset identifiers from the first plurality of media asset identifiers by:
generating for display the first plurality of media asset identifiers using a first color; and
generating for display the second plurality of media asset identifiers using a second color, different from the first color.

19. The system of claim 11, wherein the output circuitry is configured to visually distinguish the second plurality of media asset identifiers from the first plurality of media asset identifiers by:
generating for display the first plurality of media asset identifiers as having a first shape; and
generating for display the second plurality of media asset identifiers as having a second shape, different from a first shape.

20. The system of claim 11, wherein the output circuitry is configured to visually distinguish the second plurality of media asset identifiers from the first plurality of media asset identifiers by:
generating for display the first plurality of media asset identifiers using a first font; and
generating for display the second plurality of media asset identifiers using a second font, different from the first font.

* * * * *